April 3, 1956 N. M. SULLIVAN 2,740,513
ADJUSTABLE WIDTH ROLLER SKATE-TYPE GRAVITY CONVEYOR
Filed March 18, 1953 6 Sheets-Sheet 1
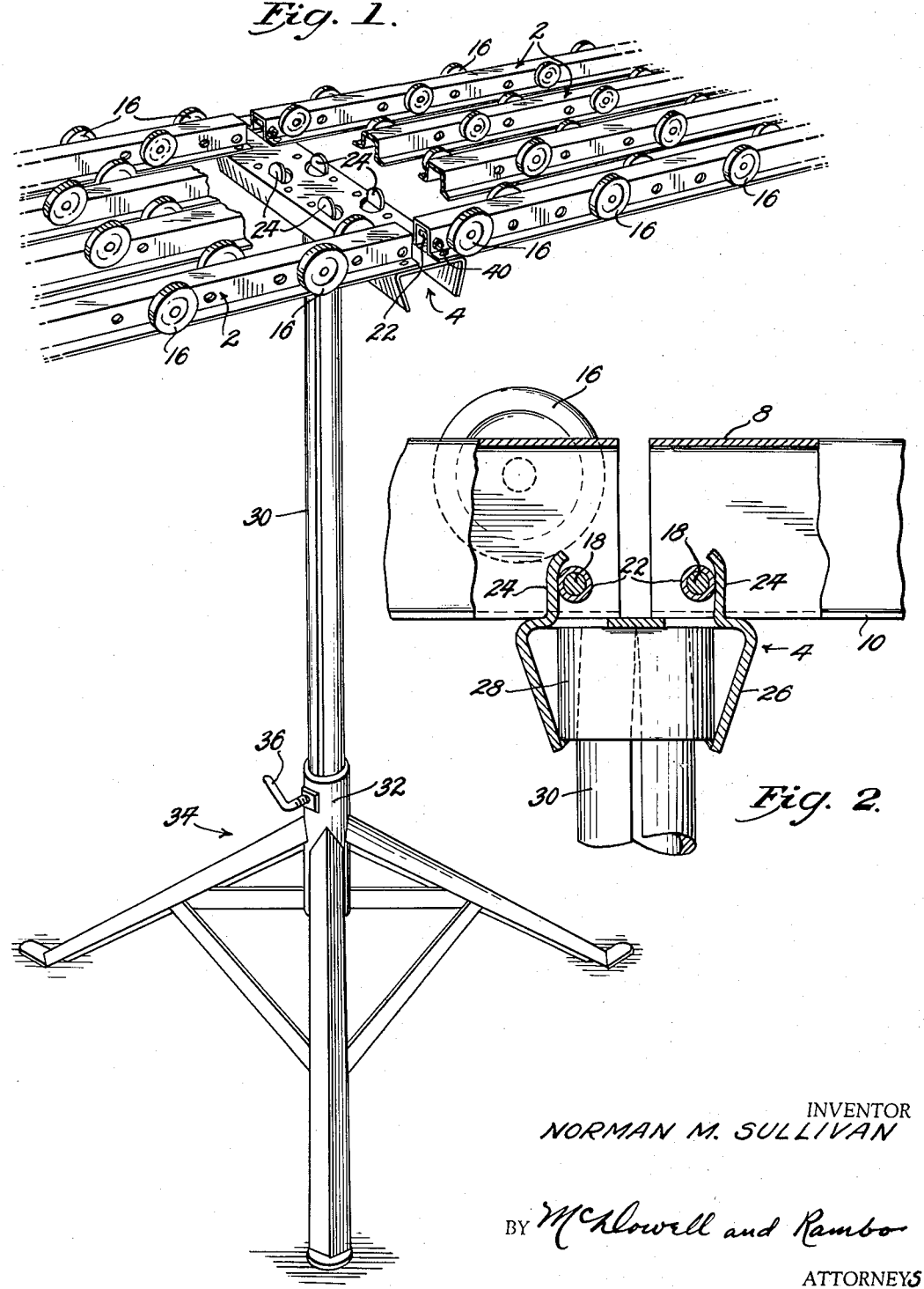
INVENTOR
NORMAN M. SULLIVAN
BY McDowell and Rambo
ATTORNEYS

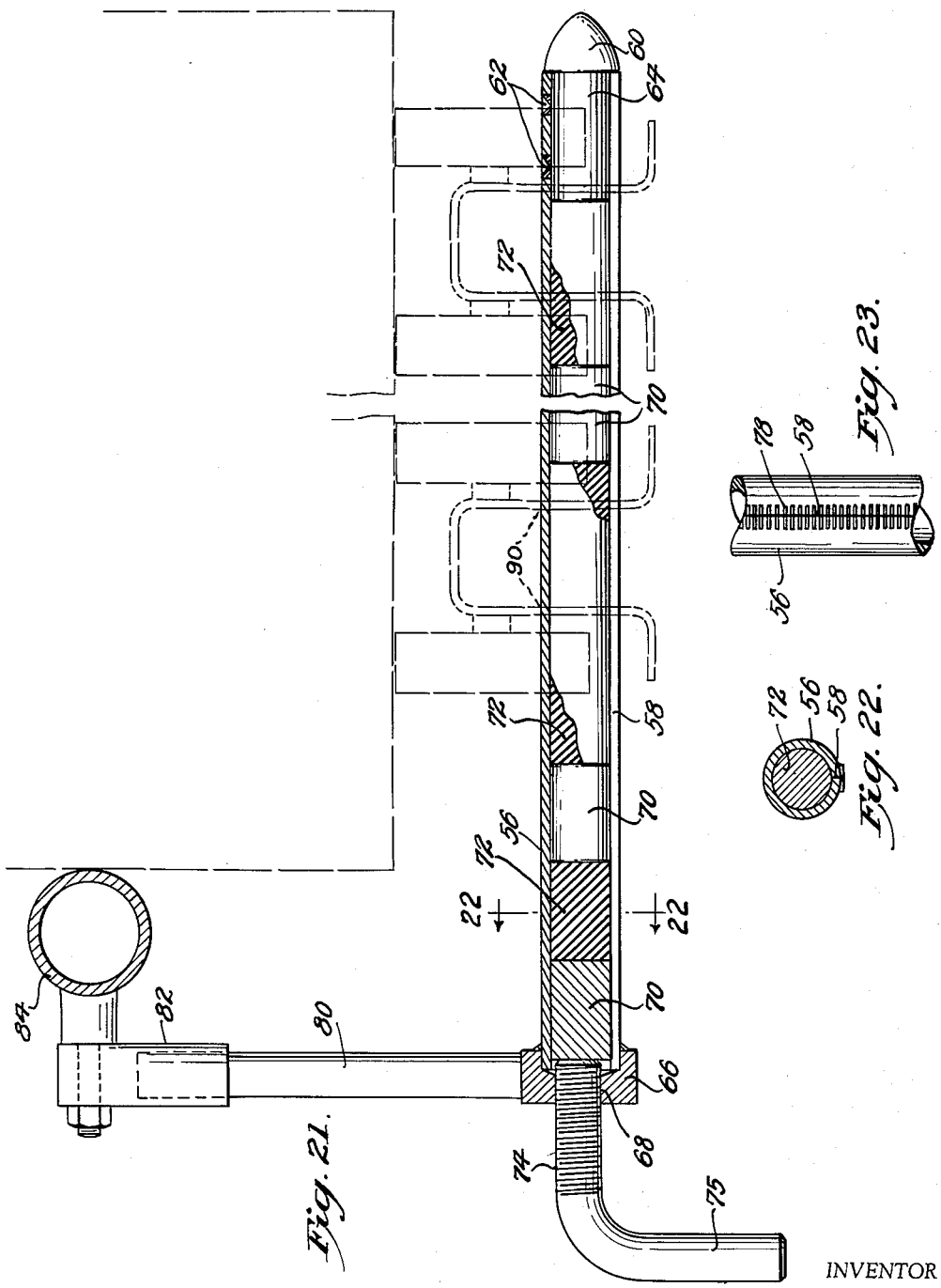

April 3, 1956 N. M. SULLIVAN 2,740,513
ADJUSTABLE WIDTH ROLLER SKATE-TYPE GRAVITY CONVEYOR
Filed March 18, 1953 6 Sheets-Sheet 3

INVENTOR
NORMAN M. SULLIVAN

BY McDowell and Rambo
ATTORNEYS

INVENTOR
NORMAN M. SULLIVAN
BY McDowell and Rambo
ATTORNEYS

April 3, 1956     N. M. SULLIVAN     2,740,513
ADJUSTABLE WIDTH ROLLER SKATE-TYPE GRAVITY CONVEYOR
Filed March 18, 1953     6 Sheets-Sheet 5
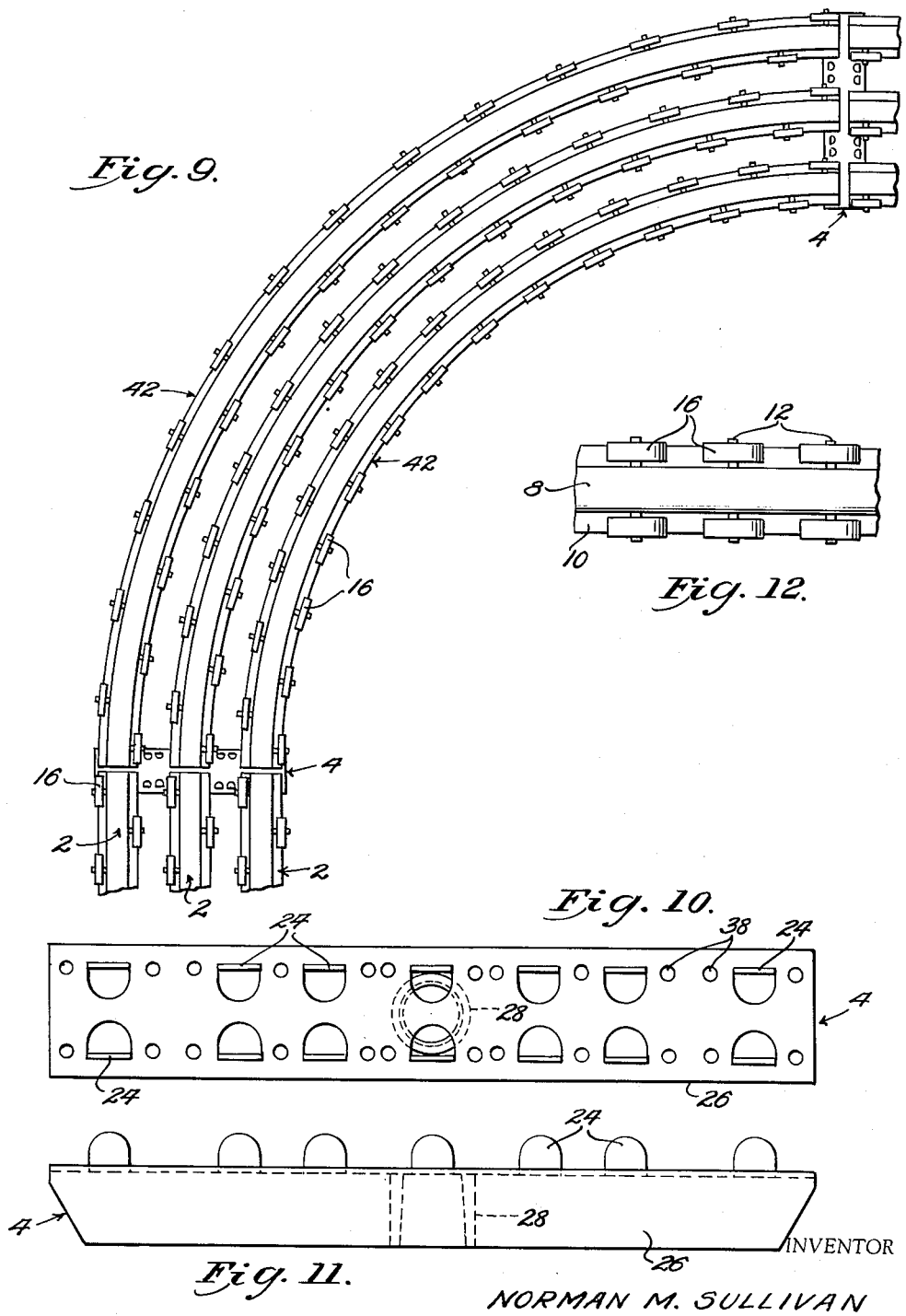

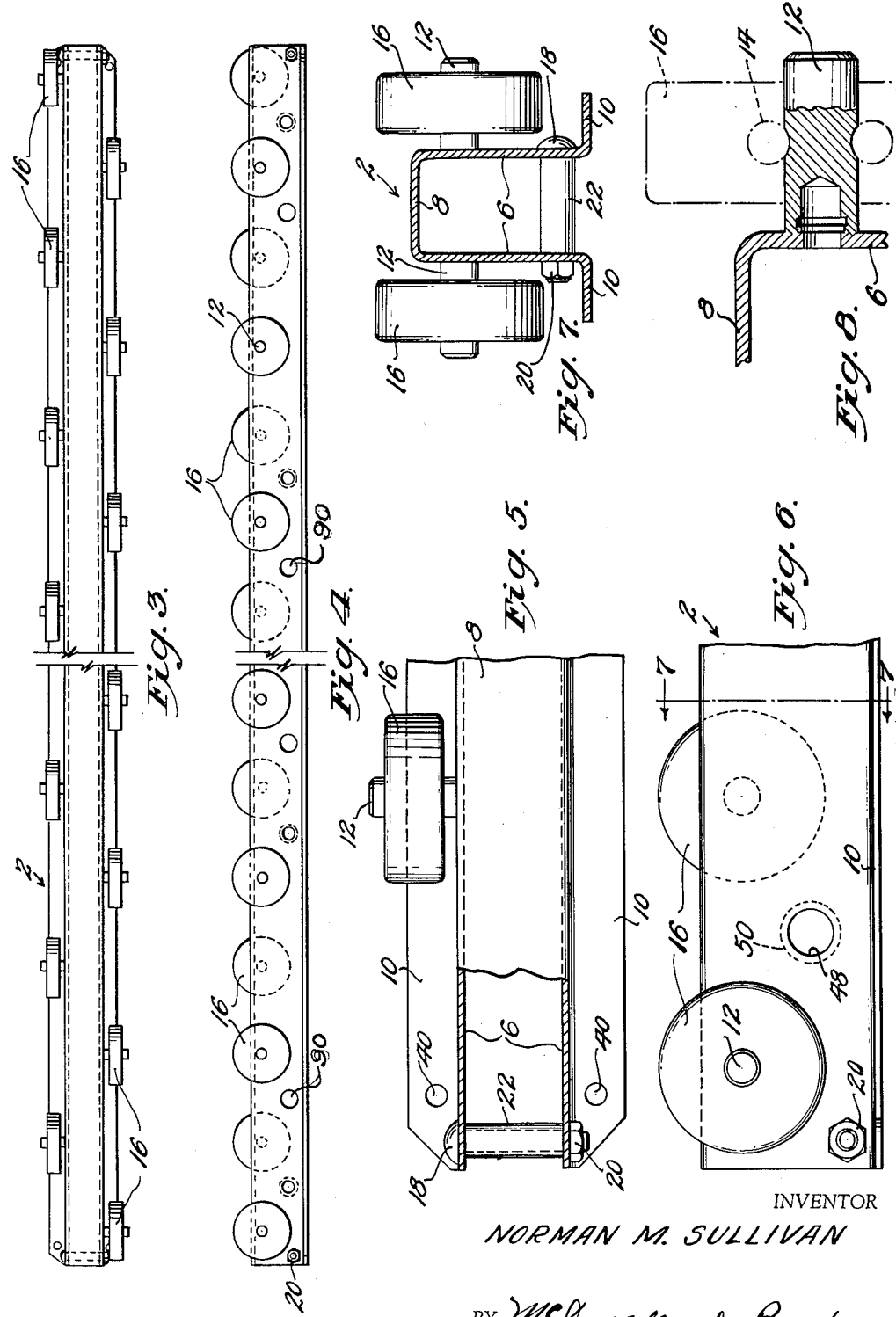

United States Patent Office 2,740,513
Patented Apr. 3, 1956

2,740,513

ADJUSTABLE WIDTH ROLLER SKATE-TYPE GRAVITY CONVEYOR

Norman M. Sullivan, Cincinnati, Ohio, assignor to The Alvey Ferguson Company, Cincinnati, Ohio, a corporation of Ohio Application March 18, 1953, Serial No. 343,136

7 Claims. (Cl. 193—35)

The present invention relates generally to conveying apparatus, and more particularly to an improved wheel-type gravity conveyor comprising a substantially continuous uninterrupted track bed formed by a multiplicity of antifriction wheel devices upon which various bulk articles, such as packages, boxes, and the like, may be positioned and caused to progress longitudinally of the bed by gravitational forces.

In the past, gravity-type conveyors have generally comprised relatively heavy, elongated, flat, trough-like frame sections having upturned side wall members between which extend a plurality of transversely disposed axle members which rotatably carry at spaced intervals therealong a plurality of wheel or roller elements whose outer peripheral surfaces extend generally above the frame portion of the conveyor to provide an antifriction bed for articles placed thereon. The complete conveyor system was generally made up of a plurality of such rectangular frame members suitably joined at their respective ends with longitudinally contiguous conveyor frame sections, so as to provide an antifriction conveyor bed of substantially fixed width extending between remotely located loading and discharge stations.

In all previous gravity-type conveyor constructions of which I am aware, the frame sections of the conveyor were of fixed width and were provided with various but fixed numbers of roller or wheel elements so spaced relative to one another as to receive and support articles of a given size and weight range, the spacing and number of roller or wheel elements being predetermined at the time of manufacture of the conveyor sections so as to provide the optimum support for a given size and weight range of articles to be conveyed. In this connection, it is understood that where such conveyors are to be utilized in connection with relatively large size and lightweight packages or articles, the spacing between the individual roller or wheel elements of the conveyor may be relatively wide, and the number of roller or wheel elements may be reduced so long as sufficient support is provided for the article during its conveyance to prevent tipping, or to prevent the same from lodging in the spaces between the wheel elements. On the other hnad, where relatively smaller and heavier packages are to be conveyed, the spacing between the individual roller or wheel elements must, of necessity, be relatively close in order to provide ample support for such articles during conveyance.

Thus, it has been common practice in the art to manufacture gravity-type conveyors more or less in accordance with the requirements of particular installations, taking into consideration the general size and weight of articles to be conveyed at such installations. This practice results in more or less custom manufacture of gravity-type conveyors, or at least limits manufacture of such conveyors to standard width sizes having varying numbers and spacing of wheel or roller elements per linear foot of conveyor.

Accordingly, it will be understood that a purchaser must buy either a relatively expensive large width conveyor having a multiplicity of closely spaced wheel elements when he desires to use the conveyor for a wide range of package sizes and weights, or he may select a given width and size of gravity-type conveyor suitable for use with a limited size range of articles, in which instance he is restricted in the use of such conveyor in connection with packaged or bulk articles of a given size range, and may not employ a conveyor which is adapted for the conveyance of relatively large and lightweight articles to convey relatively small area heavy objects, or vice versa.

It is, therefore, the primary object of the present invention to provide a conveyor construction comprising a plurality of individual relatively narrow rail sections or units provided on each side thereof and at spaced longitudinal intervals throughout their lengths with a multiplicity of antifriction wheel or roller elements which extend above the plane of the rail sections to form an antifriction conveyor bed, and wherein the individual rail sections or units may be arranged in variably spaced transverse relation to one another so as to vary the overall width of a given conveyor bed and also the number and spacing of the wheel or roller elements comprising such bed, and thereby adapt the conveyor to receive articles of varying sizes and weights and efficiently convey the same by gravity between loading and discharge stations.

Another object of the invention is to provide a so-called "skate wheel" type of gravity conveyor made up of a plurality of separate, transversely spaced parallel rail sections and means for adjustably supporting and maintaining the individual rail units or sections in random variably spaced transverse relation to one another and in longitudinal or axial alignment with the adjoining ends of adjacent rail sections, and wherein the supporting means provides for quick and facile adjustment in the number and spacing of the individual rail units making up a given conveyor bed.

A further object of the invention is to provide in a conveyor system a unitary elongated rail member of generally inverted U or hat-shape cross-sectional configuration which is provided on opposite sides thereof and at longitudinally spaced intervals throughout the length of the rail unit with laterally projecting stub shafts or axle studs which rotatably support a like number of antifriction rollers or skate wheels arranged to have a portion of their outer peripheral surface extending above the rail unit, and wherein the spacing between the wheel elements disposed on opposite sides of the rail unit constitutes a substantial proportion of the overall width of a conveyor bed made up of a plurality of such units.

A still further object of the invention is to provide a gravity-type conveyor comprising a plurality of separate, spaced, parallel rail units provided on opposite sides thereof with antifriction roller or wheel elements, and wherein the individual roller or wheel elements are rotatably carried upon relatively short stub shafts or axles which are securely welded at their inner ends to the sides of the rail unit in a manner providing a substantially integral connection between the rail sections and the wheel-supporting axle shafts, thus providing an extremely rugged and durable construction capable of efficiently supporting and conveying packages and articles of relatively great weight.

Yet another object of the invention is to provide a gravity-type conveyor comprising a plurality of separate, transversely spaced, parallel, wheel-carrying rail units of the character set forth, wherein the individual rail units or sections are joined and maintained in adjustable predetermined spaced relation to one another by means of transversely extending crosstie members which permit of quick and facile relative adjustment in the spacing between the individual rail sections, and which at the same time function to maintain the rail sections in their adjusted positions against relative transverse and longitudinal movement.

Another object of the invention is to provide an improved connector for quickly uniting the individual wheel-carrying rail sections in random adjusted positions which comprises a diametrically expansible metallic tubular element arranged to extend through transversely registering openings formed in the side walls of the rail units, and which, upon expansion, through actuation of a relatively simple manually operable crank or screw member, serves frictionally to engage the individual rail sections and maintain the same in predetermined spaced relation against relative transverse and longitudinal movement.

A still further object of the invention is to provide an antifriction conveyor of the character set forth, wherein the individual rail sections and other component parts making up an entire conveyor assembly are of relatively lightweight readily portable construction, whereby a single person may easily lift and handle the same in assembling or disassembling the conveyor.

For a further and more detailed understanding of the present invention and the various additional objects and advantages realized therefrom, reference is to be had to the following description and the accompanying drawings, wherein:

Fig. 1 is a fragmentary perspective view of my improved gravity conveyor illustrating one of the supporting standards and crossties for supporting and maintaining the individual rail components making up the conveyor bed in operative track-forming order;

Fig. 2 is an enlarged vertical sectional view taken through one of the crosstie sections disposed at the adjoining ends of the rail units;

Fig. 3 is a top plan view of one of the straight rail sections or units of the present conveyor;

Fig. 4 is a side elevational view thereof;

Fig. 5 is an enlarged fragmentary top plan view, partially in horizontal section, taken through one end of one of the rail units;

Fig. 6 is an enlarged fragmentary side elevational view of an end portion of one of the rail units;

Fig. 7 is a transverse vertical sectional view taken along the line 7—7 of Fig. 6;

Fig. 8 is a fragmentary transverse vertical sectional view taken through one of the wheel-supporting axles and showing its welded connection with an associated rail member;

Fig. 9 is a top plan view illustrating a curved section of a conveyor bed embodying the present improved individual wheel-supporting rail units;

Fig. 10 is a top plan view of one of the crosstie connectors for supporting, spacing and uniting the ends of longitudinally adjoining rail sections;

Fig. 11 is a side elevational view of the crosstie;

Fig. 12 is a fragmentary top plan view of a rail unit having the wheel or roller elements disposed in transverse alignment;

Fig. 21 is an enlarged transverse vertical sectional view taken along the line 21—21 of Fig. 20;

Fig. 22 is a detail transverse vertical sectional view taken along the line 22—22 of Fig. 21;

Fig. 23 is a fragmentary bottom plan view of the split-sleeve connector shown in Fig. 21.

Figure 16:
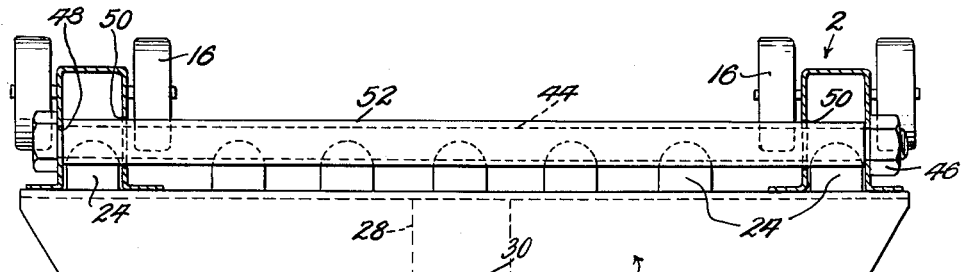
Fig. 16 is a similar view of a two-rail assembly.

Referring now to the drawings, it will be seen that the present gravity conveyor comprises a plurality of separate spaced, parallel, elongated rail sections, generally designated by the reference numeral 2, which are detachably connected and supported at their ends in longitudinal alignment with adjoining rail sections by means of crosstie supports 4. As shown particularly in Fig. 7, each rail unit or section is preferably formed from metallic plate stock bent to provide a substantially inverted U or "hat"-shape cross-sectional configuration defined by vertical side walls 6, a connecting top wall 8, and laterally projecting base flanges 10.

Welded to the outer sides of the opposite side walls 6, at spaced longitudinal intervals therealong, as shown particularly in Fig. 8, are a number of stub shafts or axle studs 12 to each of which is suitably connected, by means of roller bearings indicated at 14, a roller or wheel 16 of the type commonly employed in roller skates. As shown in Fig. 3, the wheels disposed on one side of the rail section may be arranged in transversely offset or longitudinally staggered relation to the wheels disposed on the opposite side of the rail section, or, as shown in Fig. 12, may be arranged in transverse alignment where closer spacing is desired.

Extending through openings formed in the side webs 6 of the rail sections at each end thereof is a headed bolt 18 which receives a cooperatively screw-threaded nut 20 on the opposite side of the rail section, and which carries between the vertical webs 6 of the rail section a tubular sleeve 22. The sleeve 22 cooperates with the head of the bolt 18 and the nut 20 to rigidify the end portions of the rail sections 2, and also to provide a catch for engagement with one of the upstanding lugs or ears 24 formed on and projecting upwardly from the upper surface of the crosstie 4.

As shown particularly in Figs. 1 and 2, the crosstie 4 comprises an inverted metallic channel member 26 which is rigidly welded to a cylindrical collar 28 carried at the upper end of a split sleeve standard 30. The standard 30, at its lower end portion, is received within the bore of a vertically positioned bearing sleeve 32 rigidly carried by and forming a part of a tripod base pedestal 34. The standard 30 is adjustable vertically within the sleeve 32 by loosening a screw-threaded set screw-type crank 36, and by tightening inwardly upon the manually operable crank 36, the standard 30 is securely fastened within the pedestal sleeve 32 against relative vertical displacement.

As shown in detail in Fig. 2, the upper web of the channel crosstie member 26 is formed with transversely spaced rows of upstruck lugs or ears 24 which enter the channels of the rail sections 2 to engage the crosspieces or sleeves 22 and the sides of the rail sections in a manner to locate and maintain the latter in relatively transversely spaced relation to one another, and in longitudinal alignment with adjoining rail sections connected with the opposite row of lugs. To connect or disconnect the rail sections with or from the crosstie supports 4, it is merely necessary to displace the rail sections vertically with respect to the lugs or ears 24 to either engage or disengage the same, and when connected in this manner, the lugs 24 function to hold the individual rail sections in predetermined transversely spaced relation and against relative longitudinal movement. As shown particularly in Figs. 10 and 11 of the drawings, the crosstie members 4 may be formed to provide any desired number of lugs in each row so as to permit of varied adjustment in the transverse spacing of the rail members, to thereby vary the overall width of the conveyor bed, as well as to increase or decrease the number of rail units and consequently the number of wheel supports per linear foot of conveyor.

The spacing between the individual lugs or ears 24 is such as to permit the lateral base flanges 10 of the rail sections to lie flatly upon the upper flat surface of the cross tie members, and advantageously, the upper surface of the crosstie members, between the individual lugs or ears 24, is provided with a plurality of bolt-receiving openings 38 which are adapted to be brought into registration with complemental bolt-receiving openings 40 formed in the base flanges 10 of the rail section, in order that where a more permanent installation is desired, the individual rail sections may be securely bolted to the cross tie members to add rigidity to the overall conveyor assembly. In this connection, it will be understood that where a given width and size of conveyor is to be utilized by the purchaser over a relatively long period of time, it may be desirable to bolt the end portions of the rails to the crossties in a semi-permanent manner, but in installations where it is desirable to vary the width and number of wheel supports at relatively frequent intervals to adapt the conveyor to different sizes and weights of articles, it is only necessary to detachably connect the ends of the rail members to the crossties by means of the positioning and holding lugs 24, thus eliminating the necessity for semi-permanent bolting of the rail sections to the crosstie.

It will further be understood that the individual rail sections or units 2 may be provided in curved, as well as straight sections as shown in Fig. 9 to accommodate the conveyor to various installations requiring angular bends throughout the length thereof, and in such instances, the individual curved rail sections, indicated at 42, are provided at their respective ends with the cross pieces or sleeves 22 for engagement with the ears 24 of the crosstie members.

Figure 14:
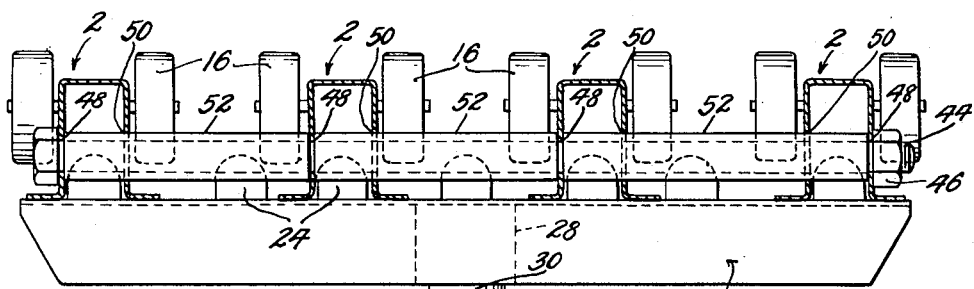
Fig. 14 is a transverse vertical sectional view taken through a conveyor assembly embodying four of the present wheel-carrying rail sections united by a replaceable sleeve-type connector.

Figs. 14 through 19 illustrate a series of possible variations in the number and transverse spacing of the individual rail sections with a given length of crosstie member. Fig. 14 illustrates four of the wheel-carrying rail sections 2 connected with the crosstie 4 in an installation providing for equal and relatively close spacing between the individual wheel elements 16.

Figure 15:
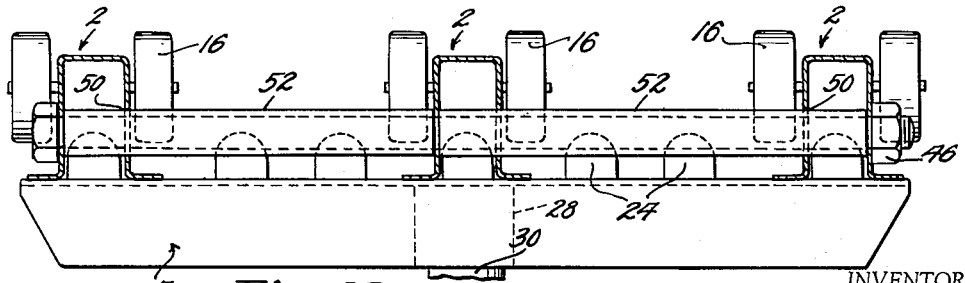
Fig. 15 is a similar view disclosing a three-rail assembly.

Fig. 15 illustrates a conveyor assembly of the same overall width as the four rail assembly disclosed at Fig. 14, but with one of the rail sections removed, and an intermediate rail section shifted to the center of the crosstie. Fig. 16 illustrates a two rail conveyor assembly having the same overall width as those shown in Figs. 14 and 15, and wherein the two intermediate rail sections of Fig. 14 are removed to provide a conveyor for handling relatively large area and lightweight articles.

Figure 17:
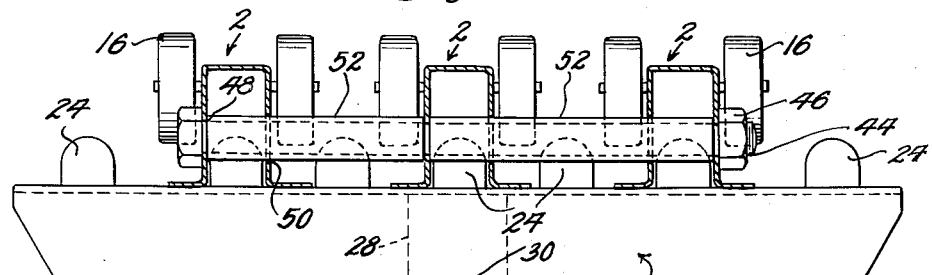
Fig. 17 is a similar view of a three-rail assembly wherein the relative spacing between the individual rails and the width of the conveyor assembly is reduced as respects the assembly of Fig. 15.

Fig. 17 illustrates a three rail conveyor of relatively reduced overall width as compared with Fig. 15, and wherein the individual rail sections are so arranged on the crosstie as to provide equal and relatively close spacing between the individual wheels comprising the conveyor.

Figure 18:
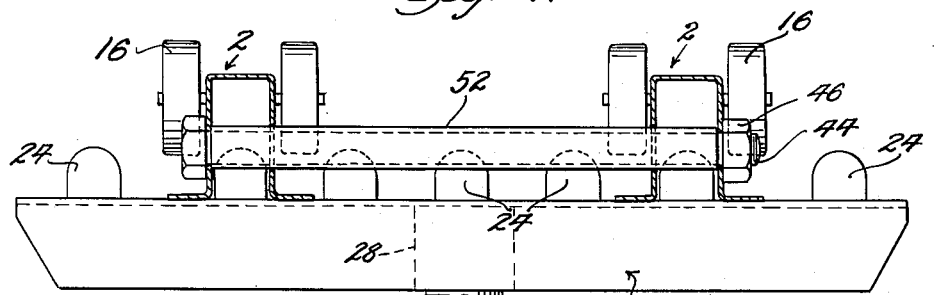
Fig. 18 is a similar view of a two-rail narrow gauge assembly.

Fig. 18 illustrates a conveyor of the same overall width as that disclosed in Fig. 17, but wherein the conveyor comprises but two of the rail sections.

Figure 19:
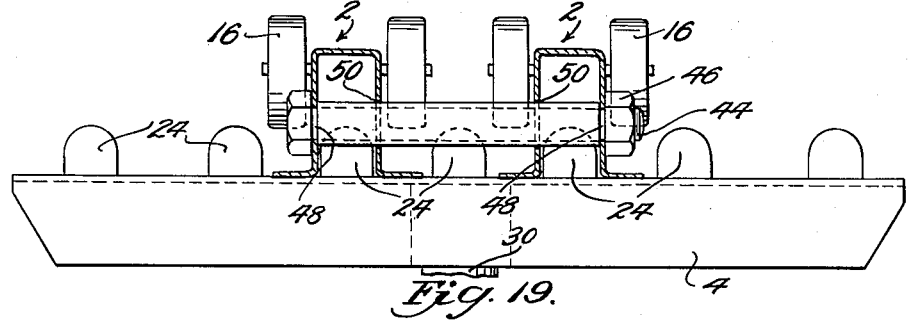
Fig. 19 is a similar view of yet another two-rail assembly.

Fig. 19 is another illustration of a two rail assembly providing a still narrower gage conveyor bed.

In connection with Figs. 14 through 19, it will be understood that the individual crosstie members 4 have the ears or lugs 24 thereof spaced so as to make possible the various assemblies shown in these several views simply by eliminating and/or rearranging certain of the rail sections to arrive at a conveyor having the desired width dimensions and number of rollers per linear foot of the conveyor.

Figs. 14 through 19 also illustrate a modified type of connector which may be used either in addition to or independently of the lug-type of crosstie 4. This latter connector comprises an elongated headed rod or bolt member 44 having an outer screw-threaded end region adapted to receive a cooperatively threaded nut 46. To receive this type of connector, the individual rail sections have their vertical side walls 6 formed at spaced longitudinal intervals with transversely registering openings of different diameters, the smaller of these openings being indicated at 48 and the larger thereof at 50. Carried upon the intermediate length of the rods or bolts 44 and between the rail sections are one or more spacer sleeves 52 whose diameter is slightly less than the diameter of the larger openings 50 formed in each of the rail sections, but substantially larger than the smaller openings 48 thereof. Thus, as illustrated in Figs. 14 through 19, the individual sleeve members 52 are arranged so as to extend transversely through the channel formed in each of the rail sections and abut against one of the vertical side walls thereof, whereby upon tightening of the nuts 46 upon the outer ends of the rods 44, one of the side walls 6 of each rail unit containing the smaller opening 48 will be securely clamped between the end of a sleeve 52 and the head of the bolt 44 or the nut 46, or between relatively adjoining ends of two of the sleeves. In this manner, the spacer sleeves, in cooperation with the nuts 46 function to maintain a desired spacing between the individual rail sections and at the same time unite such sections in a manner preventing relative longitudinal movement therebetween. As will be seen in comparing the disclosures of Figs. 14 through 19, the bolts 44 and sleeves 52 may be formed in varying lengths, in order to provide for substantially any desired spacing as between the individual rail sections or units, and so as to vary the overall width of the conveyor bed.

As previously stated, the spacer sleeve-type of connector illustrated in Figs. 14 through 19 may be used in association with the crosstie members 4 having the upstruck positioning and retaining lugs 24 if desired, and when so employed, merely serve to rigidify the conveyor assembly. However, it will be noted that the nature and construction of the spacer sleeve-type connector is such that the same may be employed independently of the upstruck type of crosstie, as the spacer sleeve connector functions to maintain the individual rail sections in adjusted spaced relation and to unite the same against relative longitudinal movement. Thus, the lugs 24 may be eliminated if desired and replaced by a relatively simplified crosstie construction which functions merely to support and hold the individual rail sections in longitudinally aligned order with respect to adjoining rail sections.

Fig. 21 of the drawings discloses another modified form of connector for uniting and maintaining a plurality of the present rail sections in predetermined transversely spaced relation to one another. In Fig. 21, the connector comprises an elongated cylindrical tubular body 56 formed from a suitable metal, such as steel. The tubular body 56 is split lonitgudinally of its length, as at 58, and is closed at its outer end by means of a headed plug 60 which is suitably welded within the outer end of the tubular body 56, as at 62. The plug 60 is provided with a rounded frusto-conical head, which projects outwardly from the outer end of the body 56 and forms a solid continuation thereof, and a relatively reduced diameter body portion 64 which conforms closely to the diameter of the internal bore of the tubular body 56. Welded to the opposite end of the body 56 is a collar or boss 66 which is provided with a screw-threaded bore 68 communicating with the inner end of the bore of the tubular body 56. Positioned within the bore of the body 56 are a plurality of metallic cylindrical blocks 70 which are spaced one from the other by intervening cylindrical bars 72 formed from a suitable resiliently flexible material, such as rubber or one of the synthetic elastomers having the properties of rubber, and having a consistency approximating the rubber used in automotive tire casings. Threadedly received within the screw-threaded bore 68 of the collar 66 is a cooperatively threaded shaft 74 having an angularly related crank arm 76 which may be rotated to move the screw-threaded shaft 74 inwardly of the bore of the split tube member 56 to cause the rigid metallic slugs or cylinders 70 to squeeze the rubber or resilient cylinders 72 causing the same to expand radially and exert expansion pressures upon the metallic tube 56. The normal outer diameter of the tubular body 56 is such as to fit closely within transversely registering sets of openings 90 formed in the vertical side walls of the individual rail sections, and at the same time to permit the rail sections to be moved transversely relative to one another and longitudinally of the tubular member 56. However, by screwing inwardly upon the crank 76, the outer wall of the tubular member 56 is expanded diametrically to frictionally engage the walls of the rail sections defining the openings through which the tubular member extends in a manner to clamp the same in fixed positions along the length of the tubular member. Frictional engagement between the outer surface of the tubular member 56 and the walls of the rail sections defining the associated openings is further increased by providing knurled or roughened areas 78 on either side of the longitudinal split or slot 68 formed in the tubular member.

Figure 20:
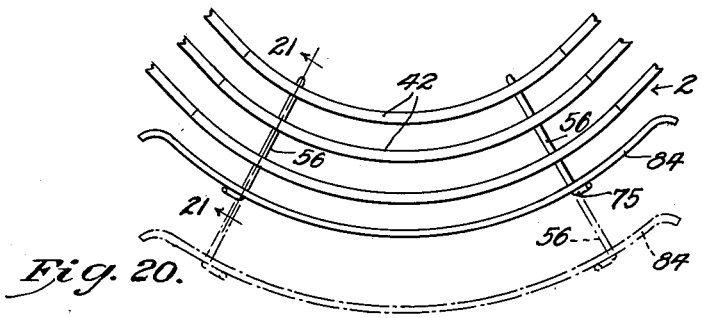
Fig. 20 is a small-scale top plan view showing a curved conveyor segment and a laterally offset guard rail therefor.
Figure 13:
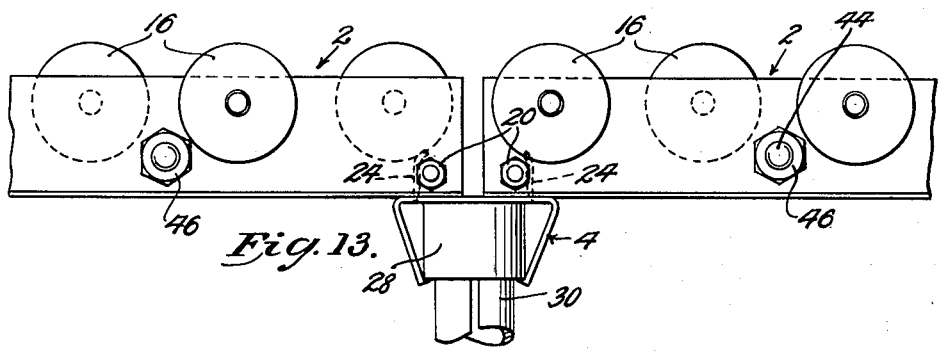
Fig. 13 is a fragmentary side elevational view, partially in vertical section, illustrating a modified form of connector for uniting and maintaining the individual rail sections in random adjusted positions.

Advantageously, as shown in Figs. 20 and 21, the circular collar 66 of the diametrically expansible connector may be formed to provide an upstanding cylindrical post 80 adapted to receive and support a tubular socket member 82 which, in turn, supports a longitudinally extending tubular guard 84 disposed in laterally offset vertically spaced relation to the outer rail section of the conveyor, in order to prevent articles being conveyed along the conveyor rails from falling laterally off the conveyor during longitudinal movement thereof over the conveyor. These guard rails 84 are particularly advantageous for use in connection with the curved portions of the conveyor, as indicated in Fig. 20, but may, if desired, be used with equal facility in connection with the straight lengths or sections of the conveyor. It will be understood that when a guard rail, such as shown at 84, is employed, a plurality of the connectors 56 are necessary to support the guard rail and to hold the same in adjustable spaced relation to the outer rail member of the conveyor. The transverse spacing between the guard rail 84 and the conveyor bed may be varied within limits by simply moving the connectors 56 inwardly or outwardly with respect to the separate rail sections 2 or 42 and thereafter expanding the connectors to engage the same with one or more of the rail sections.

In view of the foregoing, it will be seen that the present invention provides an exceptionally versatile and mechanically simple gravity conveyor which is characterized by its mechanical efficiency and ready adjustability in providing for varying widths of conveyor surface, and varying numbers of wheel supports per linear foot of conveyor. Through the provision of the supporting crosstie and connector members, the individual wheel-carrying rail sections may be adjusted at random along such crossties or connectors to provide substantially any width of conveyor and number of wheel supports per linear foot commensurate with the requirements of a particular conveying operation.

The crosstie members function to provide a convenient and simple means for spacing, supporting and uniting the adjoining ends of a given number of the separate rail sections, and to maintain the latter in conveyor track forming order.

While particular preferred forms of the invention have been disclosed in detail in the foregoing specification and drawings, it will be understood that various modifications as to details of construction and design may be resorted to without departing from the spirit of the invention or the scope of the following claims.

I claim:

1. In a gravity-type conveyor; an elongated, relatively narrow, metallic rail member of generally inverted U-shaped cross section having opposed, substantially vertically arranged sides terminating at their lower ends in laterally disposed base flanges coextensive with the length of said rail member, said base flanges being arranged to support said rail member on an associated, substantially horizontally disposed, supporting surface; a plurality of wheel-supporting studs secured to and projecting laterally outwardly from the opposite sides of said rail member at spaced longitudinal intervals therealong; and a rotatable antifriction wheel carried on each of said studs and having a portion of its peripheral surface projecting above said rail member, the wheels disposed on opposite sides of said rail member being spaced transversely apart from one another to provide at least a transverse segment of a conveyor bed.

2. In a gravity-type conveyor; a plurality of relatively spaced crosstie supports each provided with transversely spaced rows of upstanding lugs, the lugs comprising each row being spaced relative to one another longitudinally of said crosstie supports; a plurality of elongated relatively spaced parallel metallic rail sections extending between and detachably connected at their ends with said crosstie supports, each of said rail sections having a generally inverted U-shaped cross-sectional configuration and having catch means extending transversely thereof substantially at each end and engaged with one of the lugs provided on said crosstie supports, said rail members being readily detachable from said crosstie supports by moving the same vertically upwardly to disengage said catch means from the lugs of said crosstie supports and being adjustable transversely with respect to one another by engagement of said catch means with different lugs provided on said crosstie supports; and a multiplicity of rotatable antifriction wheels carried on each side of each of said rail sections at longitudinally spaced intervals therealong and having a portion of their peripheral surfaces extending above said rail sections to form an antifriction conveyor bed between said crosstie supports.

3. A gravity conveyor comprising a plurality of separate elongated rail sections arranged in parallel track-forming order, each of said rail sections being provided on opposite sides thereof and at longitudinally spaced intervals throughout the length thereof with transversely spaced rotatable wheels having a portion of their peripheral surfaces extending above said rail sections and forming an antifriction bed surface for the support and conveyance of articles positioned thereon, the transverse spacing between the wheels of each rail section defining a substantial proportion of the overall width of said bed surface; and means extending transversely of and engageable with said rail sections for adjustably maintaining the latter in various transversely spaced positions relative to one another and for holding said rail sections against relative longitudinal movement, said rail sections being generally inverted U-shape in cross section and provided substantially at the ends thereof with transverse crosspieces, and said last-named means comprising a crosstie extending transversely beneath the end portions of said rail sections and provided with transversely spaced rows of upstanding lugs engageable with the crosspieces of said rail sections to detachably hold the latter against relative longitudinal movement and in predetermined transversely spaced relation, and in longitudinally contiguous relation to an adjoining set of rail sections.

4. In a gravity-type conveyor; a plurality of elongated, spaced, parallel conveyor rail units, each of said units comprising an integral, substantially rigid, channeled rail member having relatively spaced vertical side walls terminating along their lower edges in outwardly and laterally projecting, coextensive base flanges; a multiplicity of antifriction wheels rotatably carried by each of the side walls of said rail member at longitudinally spaced intervals throughout the length of said unit and having a portion of their peripheral surfaces extending above said rail member to form a conveyor bed; crosspieces extending transversely between the side walls of said rail members substantially at each end thereof; and crosstie means arranged transversely at the ends of said rail units and having integral, upstanding, relatively spaced positioning lugs thereon adapted to enter the channels of said rail members behind said crosspieces to detachably hold said rail units in adjustable, spaced, parallel relation to one another and against longitudinal movement on said crosstie means, said crosstie means being formed between said lugs with flat, unobstructed surfaces to receive thereon the base flanges of said rail members, and the lugs of said crosstie means being arranged to provide for variable parallel spacing between each of said rail units.

5. In a gravity-type conveyor; a plurality of relatively spaced crosstie supports each provided with longitudinally spaced rows of transversely spaced upstanding lugs; a plurality of elongated, spaced, parallel conveyor rail units extending between and detachably supported at their ends by said crosstie supports, each of said rail units comprising an elongated, substantially rigid rail member having a downwardly opening channel therein and a multiplicity of antifriction wheels rotatably carried at longitudinally spaced intervals on each side of said rail member and having a segment of their peripheral surfaces extending above said rail member to provide a conveyor bed; and catch means extending transversely of the channel of said rail member substantially at each end thereof for holding engagement with one of the lugs of said crosstie supports, said rail units being readily detachable from said crosstie supports by moving the units vertically upwardly to disengage said catch means from said lugs, the number and arrangement of the lugs on said crosstie supports being such as to permit said rail units to be adjusted transversely relative to one another to vary the width of a conveyor bed defined by said rail units.

6. In a gravity-type conveyor; a plurality of elongated, relatively narrow, metallic rail members each formed with a pair of transversely spaced, vertically arranged side walls terminating at their lower ends in coextensive, laterally disposed base flanges; a plurality of wheel-supporting studs carried by and projecting laterally outwardly from each of the side walls of each of said rail members at longitudinally spaced intervals therealong; a rotatable antifriction wheel carried on each of said studs and having a portion of its peripheral surface projecting above said rail members, the wheels disposed on opposite sides of each of said rail members being spaced transversely apart from one another to provide at least a transverse segment of a conveyor bed formed by said plurality of rail members; and means extending transversely of and detachably engaged with said rail members for holding the latter in predetermined but adjustable transversely spaced parallel relation to one another and against relative longitudinal movement.

7. A gravity-type conveyor as defined in claim 6, wherein the side walls of each of said rail members are formed at longitudinally spaced intervals therealong with sets of transversely registering openings, the openings comprising each set being of different diameter, and wherein said last-named means comprises headed bolts extending through opposed sets of openings formed in said plurality of said members, and spacer sleeves carried on said bolts between said rail members and extending through the larger of the openings of each of said sets of openings and disposed in end-abutting relation to the side walls of said rail members containing the smaller opening of each set for securely clamping said rail members against longitudinal movement on said bolt means.

References Cited in the file of this patent

UNITED STATES PATENTS

| | | |
|---|---|---|
| 312,468 | Hinds et al. | Feb. 17, 1885 |
| 492,416 | Munchweiler | Feb. 28, 1893 |
| 842,156 | Mathews et al. | Jan. 22, 1907 |
| 984,379 | Le Valley | Feb. 14, 1911 |
| 1,021,876 | Lister | Apr. 2, 1912 |
| 1,534,334 | Stutsman | Apr. 21, 1925 |
| 1,824,276 | Kesti | Sept. 22, 1931 |
| 1,842,981 | Flintermann | Jan. 26, 1932 |
| 2,309,723 | Wilson | Feb. 2, 1943 |
| 2,438,527 | Werner | Mar. 30, 1948 |